US006077333A

United States Patent [19]

Wolfs

[11] Patent Number: 6,077,333

[45] Date of Patent: Jun. 20, 2000

[54] DEVICE FOR REMOVING MAGNETIZABLE PARTS

[76] Inventor: Paulus Wolfs, Jan Tooropstraat 29, NL-3262 TE Oud-Beijerland, Netherlands

[21] Appl. No.: 09/051,634

[22] PCT Filed: Oct. 16, 1996

[86] PCT No.: PCT/NL96/00400

§ 371 Date: Jun. 23, 1998

§ 102(e) Date: Jun. 23, 1998

[87] PCT Pub. No.: WO97/14502

PCT Pub. Date: Apr. 24, 1997

[30] Foreign Application Priority Data

Oct. 16, 1995 [NL] Netherlands ........................... 1001427

[51] Int. Cl.[7] ..................................................... B01D 35/06

[52] U.S. Cl. .................................... 96/1; 95/28; 210/222; 210/695

[58] Field of Search .................................. 96/1, 2; 95/28; 210/222, 695

[56] References Cited

U.S. PATENT DOCUMENTS

| | | | |
|---|---|---|---|
| 2,789,655 | 4/1957 | Michael et al. | 96/1 |
| 3,539,509 | 11/1970 | Heitmann et al. | 210/222 |
| 3,631,985 | 1/1972 | Taeger | 210/222 |
| 4,394,264 | 7/1983 | Schimion et al. | 210/222 |
| 4,722,788 | 2/1988 | Nakamura | 210/222 |
| 4,946,589 | 8/1990 | Hayes | 96/1 |
| 5,043,063 | 8/1991 | Latimer | 96/1 |
| 5,055,190 | 10/1991 | Hayes et al. | 96/1 |
| 5,066,390 | 11/1991 | Rhodes et al. | 210/222 |
| 5,871,642 | 2/1999 | Meeks | 210/695 |

FOREIGN PATENT DOCUMENTS

| | | | |
|---|---|---|---|
| 27 15 658 | 10/1978 | Germany . | |
| 149164 | 7/1981 | Germany | 96/1 |
| 345970 | 7/1972 | U.S.S.R. | 96/1 |
| 1308365 | 5/1987 | U.S.S.R. | 96/1 |
| 850233 | 10/1960 | United Kingdom . | |
| WO 87/05536 | 9/1987 | WIPO . | |

*Primary Examiner*—Duane S. Smith
*Attorney, Agent, or Firm*—Young & Thompson

[57] ABSTRACT

A device for removing magnetizable parts from a liquid, dry substance, or gas includes a housing and at least one magnet whose magnetic field extends into the space inside the housing. The magnet attracts magnetizable parts in the substance passing through the housing. Each magnet is positioned in a magnet holder. A spraying member is positioned in the space within the housing to clean the outside of each magnet holder.

13 Claims, 3 Drawing Sheets

DEVICE FOR REMOVING MAGNETIZABLE PARTS

BACKGROUND OF THE INVENTION

1. Field of the Invention

The invention relates to a device for removing magnetizable parts from a liquid, dry substance or gas, comprising a housing which defines a space through which the substance to be treated or the gas can be passed, as well as at least one magnet whose magnetic field extends into the space in order to attract magnetizable parts contained in the substance or the gas, each magnet being situated in a magnet holder which has an interface with the space.

2. Description of the Related Art

Such devices are known, e.g. from GB-A-850233, U.S. Pat. No. 5,043,063 and WO-A-8705536. They are commonly used in those fields in which the presence of iron particles in liquids is very undesirable, as in the application of paint in the automobile industry. In particular, in the case of the priming coat to be applied first to the metal, very high requirements have to be met since any iron particles give rise to rust formation.

According to these known devices, the magnetizable material accumulates on the outside of the magnet holder, as a result of which it is no longer necessary to clean the magnet itself. In addition, as a result of removing the magnet, the magnetic field in the liquid space is removed so that the magnet holder can be cleaned in quite a simple manner.

SUMMARY OF THE INVENTION

However, despite the removal of the magnets, iron particles may still, nevertheless, remain behind on the holder wall. The aim of the invention is to provide a device by means of which the metallic particles can be removed reliably. This aim is achieved in that a sprinkling or spraying member for cleaning the outside of each tube is situated near the top of each tube. Said sprinkling or spraying member may comprise an annular pipe provided with a plurality of sprinkling or spraying nozzles which can be fed with a fluid, such as a liquid or gas.

Each magnet holder may comprise, for example, a tube which is sealed at its end projecting into the housing and is attached at its other end to the top wall. In that case, a rod-shaped magnet is provided which is received in the tube with little clearance and with an air gap being left free.

The housing has a top wall from which each tube extends downwards into the liquid space. In order, nevertheless, to be able to manipulate the magnets easily despite the strong magnetic field, they are each attached to a yoke which can be moved up and down by means of two or more piston-and-cylinder devices.

When the magnets are raised out of their holder, the magnetic field decreases considerably at the position of the liquid space, as a result of which the material accumulated on the outside of the holders can easily be removed. In order to ensure that the material does not enter the cleaned liquid again, the bottom wall of the holder (filter housing) is provided with a discharge for removing magnetizable parts which accumulate on the outside of each tube.

The nozzles can be sited in various ways. According to a first possibility, the nozzles are situated near the top of the tubes, and are directed downwards along the tubes. In this case, the annular pipe may be situated outside the space for the substance to be treated, and the nozzles or their feed pipe routed through the holder wall, such as the lid.

This design is suitable, in particular, for larger versions of the device. The nozzles may, nevertheless, be sited at a small distance from the tubes via the lid, as a result of which the cleaning effect is excellent.

As an alternative, the nozzles can be directed horizontally towards the tubes. In this case, the annular pipe may also be situated in the holder.

BRIEF DESCRIPTION OF THE DRAWINGS

The invention will be explained in greater detail below by reference to an exemplary embodiment shown in the figures.

DESCRIPTION OF THE PREFERRED EMBODIMENTS

Figure 1:
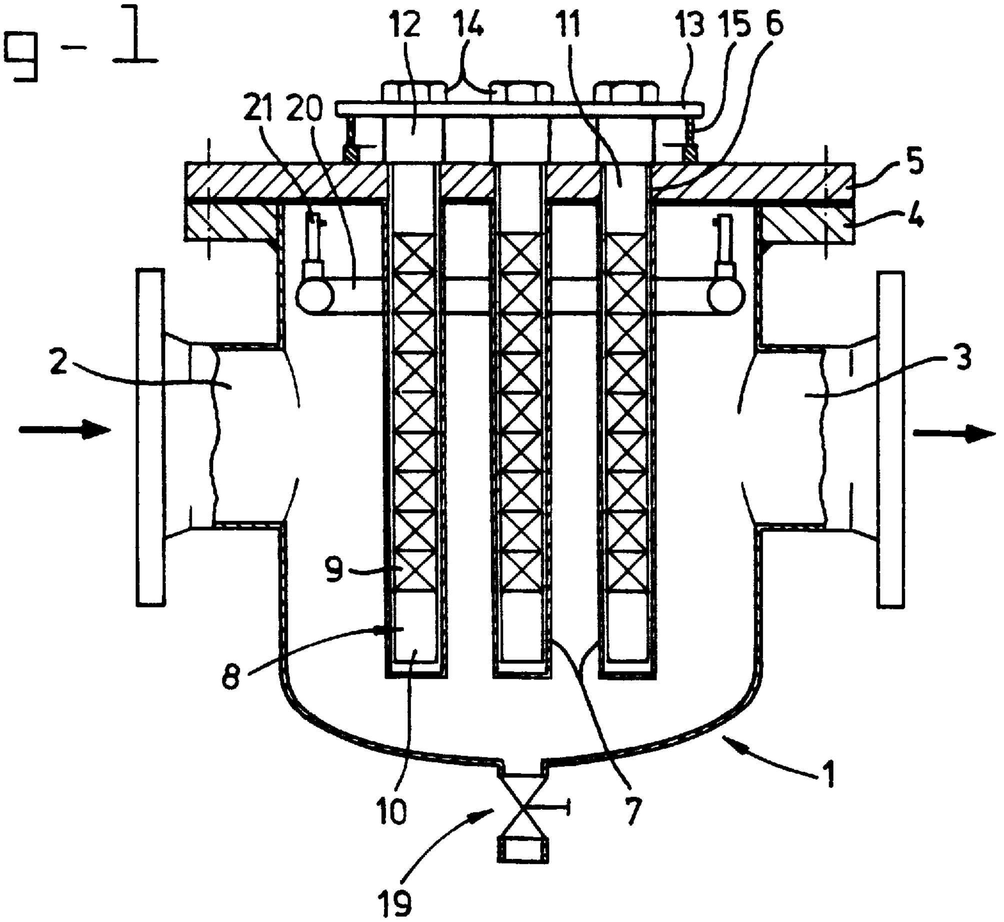
FIG. 1 shows a vertical view, partly in cross section, of the device according to the invention in the operating state.
Figure 3:
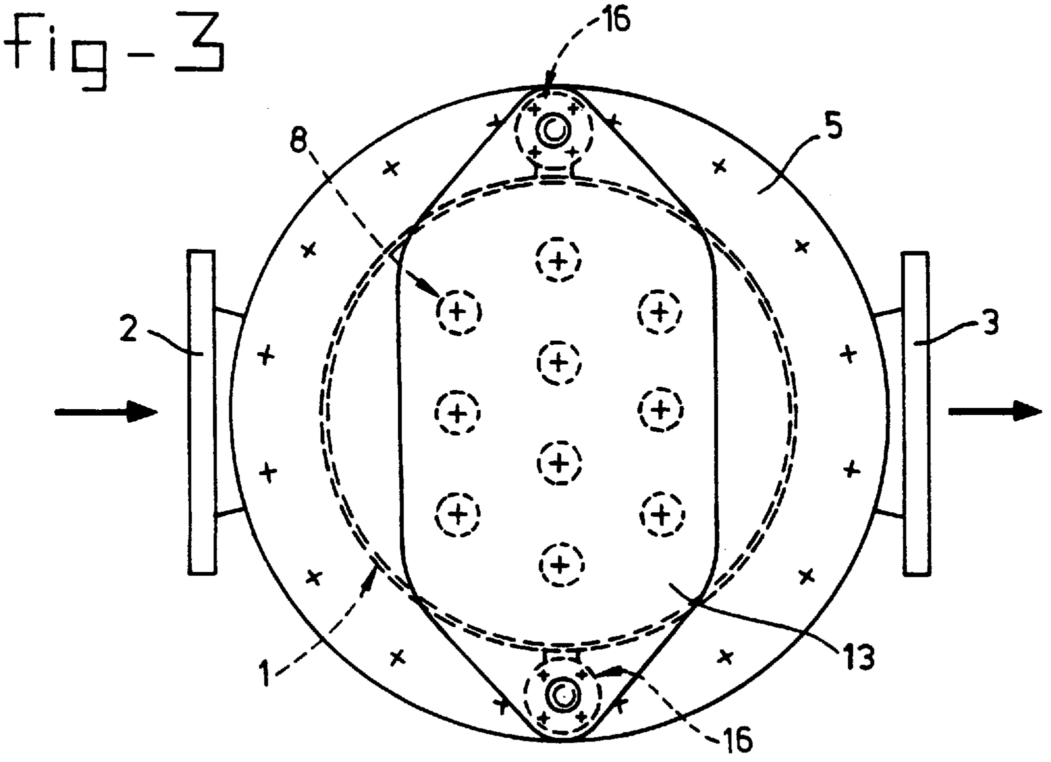
FIG. 3 shows a plan view of the device according to the invention.

The device shown in FIG. 1 comprises a housing 1 to which a pipe section 2 is secured by welding for supplying the liquid to be cleaned, as well as a pipe section 3 for removing the cleaned liquid. At the top, the housing 1 is provided with a flange 4 on which the lid, indicated in its entirety by 5, is mounted. Said lid is provided with ten holes 6, in each of which a tube 7 is secured by welding.

In the operating state, shown in FIG. 1, of the device according to the invention, a rod which is indicated in its entirety by 8 and is made up of a number of powerful permanent magnets, for example of ferrite or ceramic, alnico, or ticonal, samarium/cobalt or neodymium/iron/boron magnets as well as of plastic end pieces 10 and 11 projects into each of said tubes 7. The rods are provided at the top with a support 12 whose diameter is greater than the diameter of the holes 6 in the lid 5.

The ten rods 8 are joined by means of a screw joint 14 to the supporting plate 13, which supporting plate 13 rests, in the operating state of the device, on the raised rim 15 on the lid 5.

In the state shown in FIG. 1, metal particles contained in the substance supplied via the pipe section 2 will, in the state shown, adhere to the outside surface of the pipes 7 under the influence of the magnetic field originating from the magnets 9. After some time, a quantity of iron particles has settled on the tubes 7 which is such that the device has to be cleaned.

Figure 2:
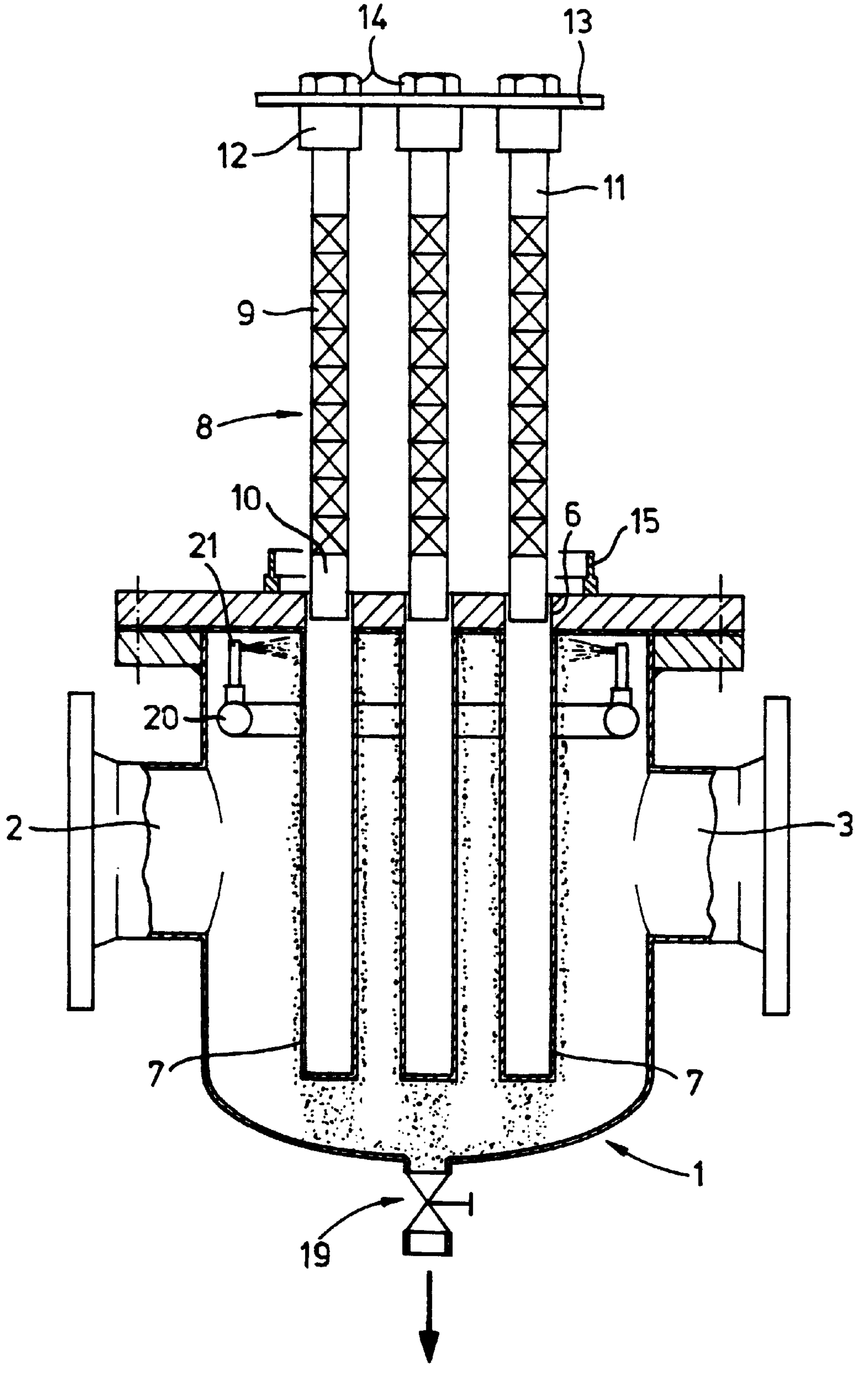
FIG. 2 shows a view as in FIG. 1, in the cleaning state.
Figure 4:
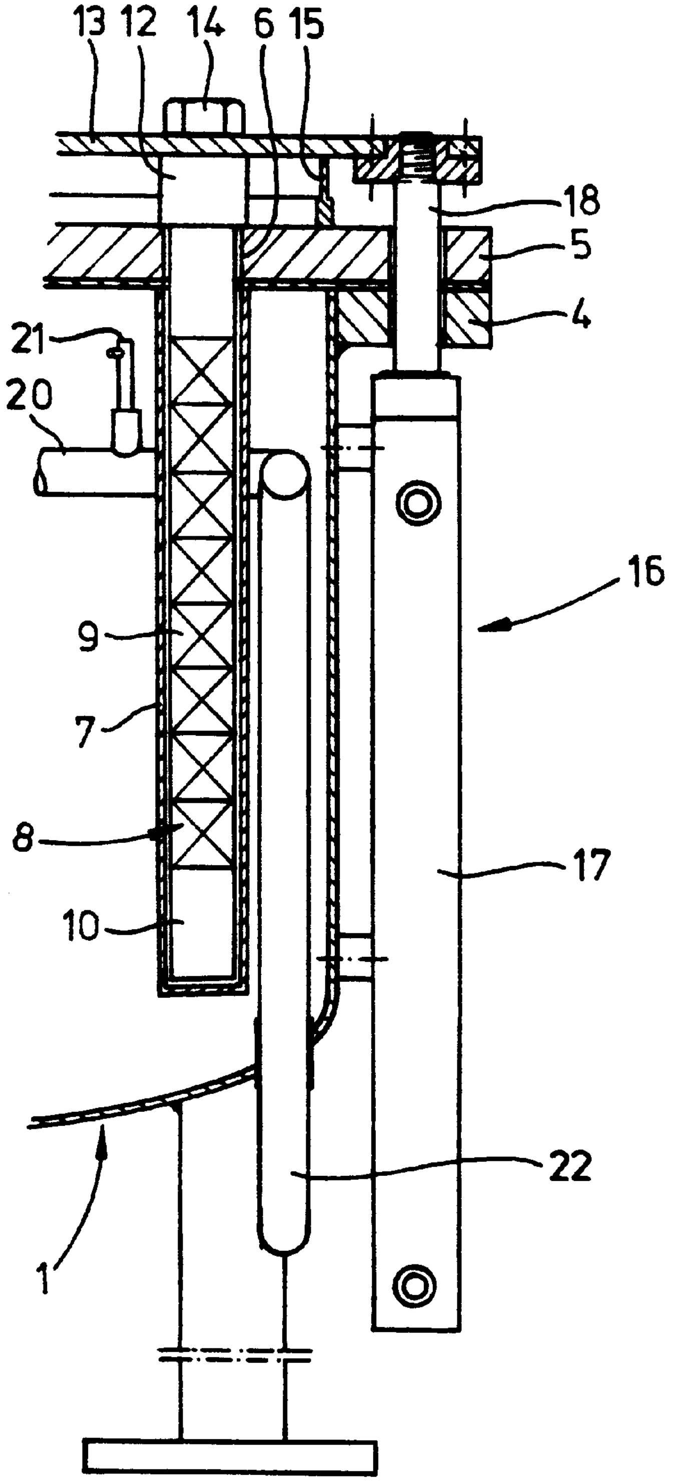
FIG. 4 shows a detail of the device according to the invention.

In connection with the cleaning of the device, the rods 8 with magnets 9 have first of all to be removed from the associated tubes. For this purpose, two hydraulic or pneumatic piston-and-cylinder devices 16, one of which can also be seen in FIG. 4, are attached to the supporting plate 13. The cylinder 17 of the pistons in the devices 16 is attached to the housing 1 and the end of the piston rod 18 is attached to the supporting plate 13. The cleaning state, shown in FIG. 2, of the device is reached by energizing the piston-and-cylinder devices 16. Since the magnets 9 are now no longer situated in the tubes 7, the iron particles situated on the outside of the tubes 7 begin to drop down onto the base of the housing 1. Said base is provided with a discharge valve 19 which is opened during the cleaning so that the substance containing the iron particles which are moving downwards can be discharged.

In order to ensure that the outside of the tubes 7 is completely and reliably cleaned, an annular pipe 20 on which sprinklers 21 are situated is provided at the top of the housing 1. The annular pipe is fed, as can be seen in FIG. 4, by a feed pipe 22 which is connected to a pressurized source containing cleaning liquid.

The sprinklers 21 direct a powerful jet onto the outside of the tubes 7 so that any iron particles still adhering thereto are rinsed downwards in a reliable way, after which they can finally be removed via the valve 19.

As soon as the device according to the invention has been cleaned in this way, the piston-and-cylinder devices 16 are again energized in order to move the supporting plate 13 with the rods 8 downwards, after which, the device is again ready to clean the substance containing iron particles.

Although ten magnets are shown in the embodiment shown, a larger or smaller number may be used, depending on the flow rate.

What is claimed is:

1. Apparatus for removing magnetizable parts from a liquid, dry substance or gas, comprising a housing (1) which defines a space through which the substance to be treated or the gas can be passed, as well as at least one magnet (8) whose magnetic field extends into the space in order to attract magnetizable parts contained in the substance or the gas, each magnet (8) being situated in a magnet holder which has an interface with the space, characterized in that a sprinkling or spraying member (20, 21, 22) for cleaning the outside of each magnet holder is situated in the space.

2. Apparatus according to claim 1, wherein each magnet holder comprises a tube (7) which is sealed at its end projecting Into the housing (1) and is attached at its ocher end to the top wall (5) of the housing.

3. Apparatus according to claim 2, wherein a rod-shaped magnet (8) is provided which fits into the tube (7) with little clearance and leaving an air gap free.

4. Apparatus according to claim 2, wherein the housing (1) has a lid (5) from which each tube (7) extends downwards into the space.

5. Device according to claim 4, wherein each rod-shaped magnet (8) is attached to a yoke (13) which can be moved up and down by means of two or more piston-and-cylinder devices (16).

6. Apparatus according to claim 4, wherein the bottom wall of the housing (1) is provided with a discharge (19) for removing magnetizable parts which accumulate on the outside of each tube (7).

7. Apparatus according to claim 1, wherein the sprinkling or spraying member comprises an annular pipe (20) provided with a plurality of sprinkling or spraying nozzles (21).

8. Apparatus according to claim 1, wherein the sprinkling or spraying member is connected to a source containing cleaning fluid.

9. Apparatus according to claim 7, wherein the nozzles are situated near the top of the tubes (7), and are directed downwards along the tubes (7).

10. Apparatus according to claim 9, wherein the annular pipe is situated outside the space for the substance to be treated, and the nozzles or their feed pipe are routed through the housing wall.

11. Apparatus according to claim 7, wherein the nozzles (21) are directed horizontally towards the tubes (7).

12. Apparatus according to claim 11, wherein the annular pipe (20) is situated in the housing (1).

13. An apparatus for removing magnetizable parts from a substance to be treated, comprising:

a housing which defines a space through which the substance to be treated can be passed;

at least one magnet whose magnetic field extends into the space in order to attract magnetizable parts contained in the substance to be treated, each said magnet being situated in a magnet holder which has an interface with the space;

a yoke to which each said magnet is attached;

a spraying member for cleaning an outside of each said magnet holder arranged in the space; and two or more piston-and-cylinder devices connected to the yoke;

wherein the yoke can be moved up and down by means of the piston-and-cylinder devices.

* * * * *